US012604188B2

(12) United States Patent
Stammers et al.

(10) Patent No.: US 12,604,188 B2
(45) Date of Patent: Apr. 14, 2026

(54) GENERATING AND MANAGING ENTERPRISE-POLICY COMPLIANT GUEST CREDENTIALS FOR MULTI-ACCESS CONNECTIVITY

(71) Applicant: Cisco Technology, Inc., San Jose, CA (US)

(72) Inventors: Timothy P. Stammers, Raleigh, NC (US); Bhavik Yogeshkumar Adhvaryu, San Jose, CA (US); Sri Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 18/351,289

(22) Filed: Jul. 12, 2023

(65) Prior Publication Data

US 2025/0024258 A1     Jan. 16, 2025

(51) Int. Cl.
| | |
|---|---|
| *H04W 4/50* | (2018.01) |
| *H04W 4/60* | (2018.01) |
| *H04W 12/069* | (2021.01) |
| *H04W 12/082* | (2021.01) |
| *H04W 12/43* | (2021.01) |

(Continued)

(52) U.S. Cl.
CPC ........... *H04W 12/069* (2021.01); *H04W 4/50* (2018.02); *H04W 4/60* (2018.02); *H04W 12/082* (2021.01); *H04W 12/43* (2021.01); *H04W 12/45* (2021.01); *H04W 84/12* (2013.01); *H04L 67/303* (2013.01); *H04W 12/35* (2021.01)

(58) Field of Classification Search
CPC ..... H04W 12/06; H04W 12/08; H04W 48/18; H04W 84/12; H04W 88/06; H04W 12/069; H04W 36/14; H04W 48/02; H04W 48/16; H04W 76/10; H04W 8/18; H04W 84/042; H04W 4/50; H04W 12/082; H04W 12/43
See application file for complete search history.

(56) References Cited

U.S. PATENT DOCUMENTS

| | | | | |
|---|---|---|---|---|
| 9,444,805 | B1 * | 9/2016 | Saylor | ..................... H04L 63/08 |
| 11,284,271 | B2 * | 3/2022 | Gundavelli | ........... H04W 16/14 |

(Continued)

OTHER PUBLICATIONS

Jason Kunst, "ISE Guest Access Prescriptive Deployment Guide", Nov. 8, 2021, obtained online from <https://community.cisco.com/t5/tkb/articleprintpage/tkb-id/4561-docs-security/article-id/5421>, retrieved on Jul. 12, 2025. (Year: 2021).*

*Primary Examiner* — Zhimei Zhu
(74) *Attorney, Agent, or Firm* — Polsinelli P.C.

(57) ABSTRACT

The method disclosed herein manages and generates enterprise-policy compliant guest credentials for connectivity to one or more enterprise networks. The method may include receiving a request from a guest user device to connect to a first network provided by an enterprise. The method may further comprise determining that the guest user device is authorized to access the first network when the access by the guest user is subject to a movement and roaming policy. A first credential may be provisioned for the guest user to access the first network that is consistent with the movement and roaming policy. Prior to receiving a second request to connect to a second network of the enterprise from the guest user device, provisioning a second credential, consistent with the movement and roaming policy, to the guest user.

20 Claims, 14 Drawing Sheets

(51) Int. Cl.

| | |
|---|---|
| H04W 12/45 | (2021.01) |
| H04W 84/12 | (2009.01) |
| H04L 67/303 | (2022.01) |
| H04W 12/30 | (2021.01) |

(56) References Cited

U.S. PATENT DOCUMENTS

| | | | | |
|---|---|---|---|---|
| 12,075,342 | B2 * | 8/2024 | Saini | H04W 8/205 |
| 2014/0189781 | A1 * | 7/2014 | Manickam | H04W 4/50 |
| | | | | 726/1 |
| 2014/0258723 | A1 * | 9/2014 | Zhang | H04L 9/3271 |
| | | | | 713/168 |
| 2015/0004940 | A1 | 1/2015 | Zhang et al. | |
| 2015/0327052 | A1 | 11/2015 | Ghai | |
| 2015/0382198 | A1 * | 12/2015 | Kashef | H04L 67/303 |
| | | | | 726/5 |
| 2018/0242137 | A1 | 8/2018 | Gupta et al. | |
| 2019/0199725 | A1 * | 6/2019 | Pularikkal | H04L 63/10 |
| 2021/0112382 | A1 * | 4/2021 | Oswal | H04L 67/30 |
| 2021/0120000 | A1 * | 4/2021 | Pularikkal | H04W 76/10 |
| 2021/0185540 | A1 * | 6/2021 | Gundavelli | H04W 4/60 |
| 2021/0281994 | A1 * | 9/2021 | Stammers | H04W 8/12 |
| 2022/0060893 | A1 * | 2/2022 | Gundavelli | H04L 63/08 |
| 2022/0086641 | A1 * | 3/2022 | Balasubramanian | |
| | | | | H04W 12/64 |
| 2022/0141643 | A1 * | 5/2022 | Balasubramanian | |
| | | | | H04W 12/06 |
| | | | | 455/558 |
| 2022/0210722 | A1 * | 6/2022 | Saini | H04W 84/12 |
| 2023/0081990 | A1 * | 3/2023 | Saini | H04W 8/205 |
| | | | | 370/338 |
| 2024/0314538 | A1 * | 9/2024 | Ståhl | H04W 12/42 |
| 2024/0381081 | A1 * | 11/2024 | Normann | H04W 12/06 |

* cited by examiner

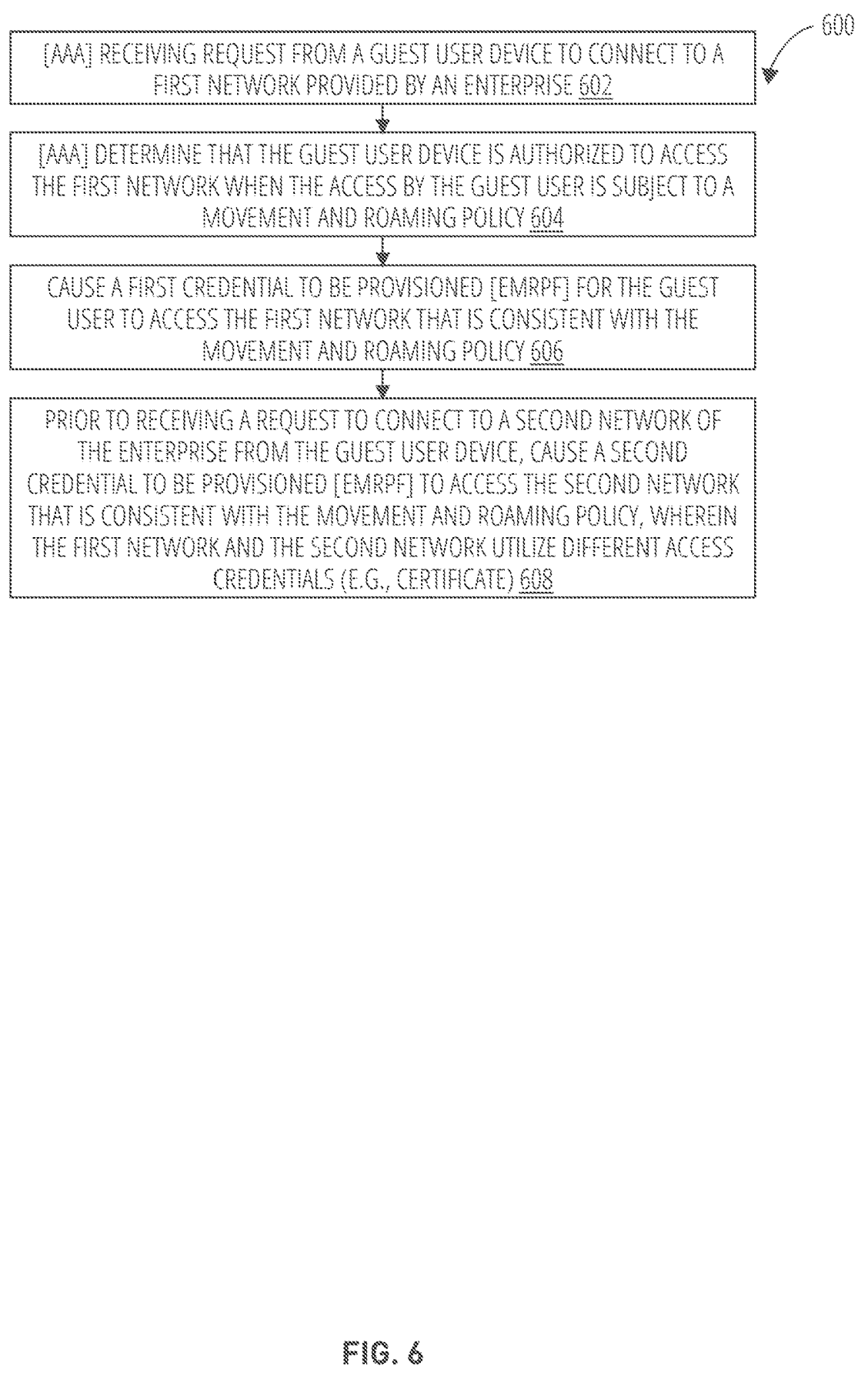

600

[AAA] RECEIVING REQUEST FROM A GUEST USER DEVICE TO CONNECT TO A FIRST NETWORK PROVIDED BY AN ENTERPRISE 602

[AAA] DETERMINE THAT THE GUEST USER DEVICE IS AUTHORIZED TO ACCESS THE FIRST NETWORK WHEN THE ACCESS BY THE GUEST USER IS SUBJECT TO A MOVEMENT AND ROAMING POLICY 604

CAUSE A FIRST CREDENTIAL TO BE PROVISIONED [EMRPF] FOR THE GUEST USER TO ACCESS THE FIRST NETWORK THAT IS CONSISTENT WITH THE MOVEMENT AND ROAMING POLICY 606

PRIOR TO RECEIVING A REQUEST TO CONNECT TO A SECOND NETWORK OF THE ENTERPRISE FROM THE GUEST USER DEVICE, CAUSE A SECOND CREDENTIAL TO BE PROVISIONED [EMRPF] TO ACCESS THE SECOND NETWORK THAT IS CONSISTENT WITH THE MOVEMENT AND ROAMING POLICY, WHEREIN THE FIRST NETWORK AND THE SECOND NETWORK UTILIZE DIFFERENT ACCESS CREDENTIALS (E.G., CERTIFICATE) 608

FIG. 6

GENERATING AND MANAGING ENTERPRISE-POLICY COMPLIANT GUEST CREDENTIALS FOR MULTI-ACCESS CONNECTIVITY

TECHNICAL FIELD

This disclosure relates generally to generating and managing enterprise policy compliant guest credentials for one or more enterprise networks.

BACKGROUND

With existing access enterprise technologies of cable or Wi-Fi, the ability to permit or deny access to a visiting user on a specific device can be managed by policies. The addition of open roaming technology facilitates the ability of visitors to obtain access without the need for a cumbersome 'guest access' approach, but the privilege level must still be determined as part of an enterprise policy. The deployment of private cellular networks under enterprise jurisdiction means that cellular technologies enabling easy roaming between administrative domains is available. Control of this 'cellular-centric' roaming capability lies with the cellular subscription management systems, i.e. Unified Data Management/Unified Data Repository ("UDM/UDR") and Home Subscriber Server ("HSS"). These systems apply controls for movement between public land mobile networks ("PLMNs") and enterprise private cellular networks but have limited knowledge of other access technologies within an enterprise. They are also unaware of enterprise policies for other access networks built on aspects such as network access (e.g., permission, privilege level, etc.), access to applications, access technology permitted (e.g., Wi-Fi, Cabled, Private Cellular, Public Cellular, etc.), and the nature of user equipment or user devices (e.g., fixed, nomadic, mobile, etc.).

These systems are also specified, designed, and scaled on the basis that there will be many tens of thousands, if not tens of millions, of subscriptions requiring seamless movement across a public cellular network and with visited public cellular networks and other enterprise access networks.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an example flowchart for managing and generating enterprise policy compliant guest credentials according to aspects of the present disclosure.

DETAILED DESCRIPTION

Figure 1:
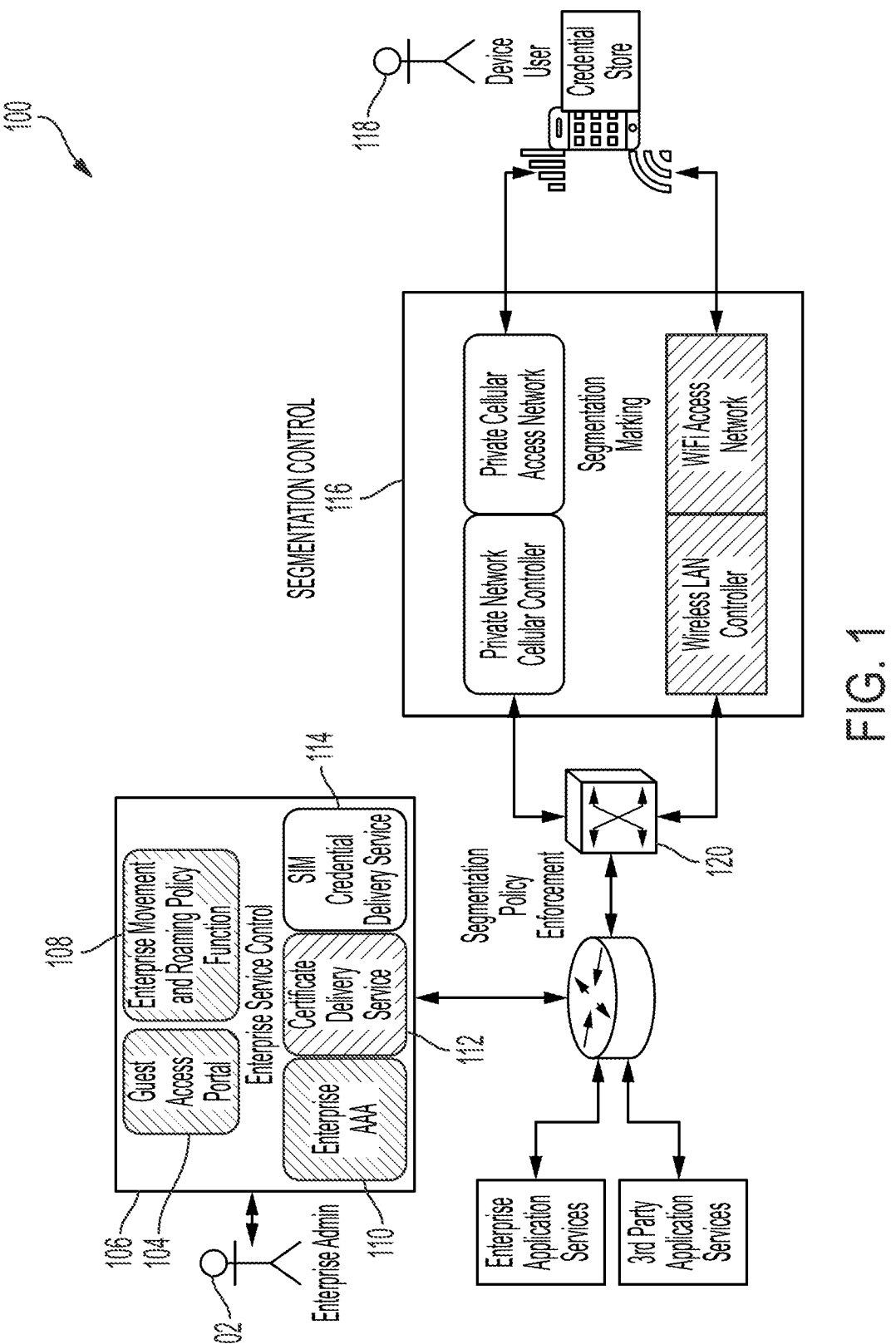
FIG. 1 illustrates a block diagram illustrating provisioning of credentials according to a movement and roaming policy according to aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Methods and systems are described herein for generating and managing enterprise policy compliant guest credentials. The method comprises: receiving request from a guest user device to connect to a first network provided by an enterprise. The method further comprises determining that the guest user device is authorized to access the first network when the access by the guest user is subject to a movement and roaming policy, causing a first credential to be provisioned for the guest user to access the first network that is consistent with the movement and roaming policy. Prior to receiving a request to connect to a second network of the enterprise from the guest user device, the method further comprises causing a second credential to be provisioned to access the second network that is consistent with the movement and roaming policy, where the first network and the second network utilize different access credentials.

The method may also comprise configuring a movement and roaming policy to apply the guest user to allow the guest user to access the first network and the second network using the guest user device, where the guest user is associated with a group of guest users, and extending the movement and roaming policy applicable to the guest user to the group of guest users. The method may also include where the first network and the second network are different types of access networks. The method may also include where the different access credentials are a Wi-Fi certificate and an eSIM.

The method may also include where the second network of the enterprise utilizes SIM-based credentials, where the enterprise includes multiple sites having local versions of the second network, the method further includes distributing the second credential to a credential store located at the respective multiple sites for the local versions of the second network.

The method may also include where the movement and roaming policy defines at least one of a movement type, a service access privilege, a session continuity type, a credential type, and an access type. The method may also include revoking the first credential and the second credential after a duration of time dictated by the movement and roaming policy.

The method may also include updating the movement and roaming policy, preparing one or more updated credentials associated with the guest user device, and provisioning the one or more updated credentials to the guest user device, which permits the guest user device to access the network. The method may also include where the movement and roaming policy includes at least segmentation policy for network data to and from the guest user device. Other technical features may be readily apparent to one skilled in the art from the following figures, descriptions, and claims.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a system for providing credentials and granting a guest device access on a Wi-Fi network that uses a first type of access credential (e.g., a certificate), and then automatically creates a profile and provides credentials for the guest device to access a cellular network that uses a different type of access credential (e.g., an eSIM). With existing enterprise technologies of cable or Wi-Fi, the ability to permit or deny access to a visiting user on a specific device can be managed by policies. The addition of open roaming technology facilitates the ability of visitors to obtain access without the need for a cumbersome 'guest access' approach, but the privilege level must still be determined as part of an enterprise policy. The deployment of private cellular networks under enterprise jurisdiction means that cellular technologies enabling easy roaming between administrative domains is available. Control of this 'cellular-centric' roaming capability lies with the cellular subscription management systems, i.e. Unified Data Management/Unified Data Repository ("UDM/UDR") and Home Subscriber Server ("HSS"). These systems apply controls for movement between public land mobile networks ("PLMNs") and enterprise private cellular networks but have limited knowledge of other access technologies within an enterprise. They are also unaware of enterprise policies for other access networks built on aspects such as network access (e.g., permission, privilege level, etc.), access to applications, access technology permitted (e.g., Wi-Fi, Cabled, Private Cellular, Public Cellular, etc.), and the nature of user equipment or user devices (e.g., fixed, nomadic, mobile, etc.).

There is a need in the art for a system that provides credentials for a second network according to previously-granted credentials for a first network and for an enterprise policy that unifies security policies for one or more networks within the enterprise. The second network and the first network may have different technology permitted, network access, network type, privilege level, etc. The access to the first network and the second network may be governed by the same enterprise access policy. Using this system, a guest user and/or guest user device is not required to go through a lengthy "guest access" process for every network within the enterprise, but may be automatically enrolled in one or more additional networks through one or more additional credentials when access is granted to a first network.

An enterprise will be associated with a dynamic guest access policy, that lays out the permissions and structure of guest devices. This policy may be defined for particular types of devices, devices associated with particular users or groups of users, roaming of the devices, etc. The policy will dictate, according to a categorization of a guest user device, what group the guest user device (e.g., fixed, nomadic, mobile, etc.) and therefore, what permissions and/or credentials the guest user device obtains from the network. An enterprise having and maintaining a dynamic guest access policy may streamline security measures, allow for efficient security updates and changes to the policy, simplified policy maintenance for administrators, and lower computational load for an enterprise controller or other computing device.

Once the policy has been created, the guest user device may obtain a credential associated with one type of network, such as a Wi-Fi network (delivered via certificate). Then, according to the policy, once the Wi-Fi network is accessed by the guest user device, the guest user device may also receive a credential associated with another type of network, such as a cellular network (delivered via eSIM). Traffic segmentation policies may then be applied for the networks enabled by the credentials. The credentials associated with the guest user device may be updated if the policy changes.

FIG. 1 illustrates a block diagram of an example environment 100 for provisioning credentials according to a movement and roaming policy according to aspects of the present disclosure. Although environment 100 may depict an arrangement of system elements, environment 100 may be altered without departing from the scope of the present disclosure.

A given enterprise may moderate the connectivity of one or more guest user devices requesting to connect to one or more networks associated with the enterprise. In some examples, the enterprise may generate a movement and roaming policy. The movement and roaming policy may dictate and/or outline a policy associating guest user devices or groups of one or more guest user devices with a common characteristic (e.g., similar type of device, associated with the same corporation or guest user, mobile device, etc.) with particular permissions within the one or more networks associated with the enterprise. A universal movement and roaming policy may allow for more efficient parsing of connectivity requests, elevate the guest user experience on the network, reduce computational load, etc.

The movement and roaming policy may dictate permissions for guest user devices on a network of the one or more networks, permission relationships between the one or more networks, a particular sector of the enterprise, etc. The movement and roaming policy may be dictated by enterprise administrator 102. Enterprise administrator 102 may be an individual, a group of individuals, etc. Enterprise administrator 102 may manage the movement and roaming policy according to the demands of the one or more networks within the enterprise and may modify the movement and roaming policy accordingly.

The movement and roaming policy may be executed by enterprise service control 104. Enterprise service control 104 may receive input from enterprise administrator 102 and may contain one or more elements. For example, enterprise service control 104 may contain guest access portal 106, enterprise policy function 108, enterprise authentication, authorization, and accounting ("AAA") 110, certificate delivery service 112, and SIM credential delivery service 114.

Guest access portal 106 may operate on a computing device (e.g., computing system 700 of FIG. 7) in enterprise service control 104. Guest user device 118 may display guest access portal 106 to a guest user associated with guest user device 118. Guest user device 118 may be a mobile phone, desktop, laptop, tablet, e-reader, printer, smartwatch, any combination thereof, or the like. Guest access portal 106 may receive input from the guest user. The guest user may indicate a request to join a first network of an enterprise via guest access portal 106. Guest access portal 106 may also be accessible to enterprise administrator 102. Enterprise administrator 102 may modify guest access portal 106 (e.g., add input fields, alter design, perform tests, change back-end or front-end aspects of guest access portal 106, any combination thereof, or the like).

Guest access portal 106 may query guest user device 118 for one or more pieces of information from the guest user, including, but not limited to, name of the guest user, demographic information of the guest user, purpose for the request to join one or more networks of the enterprise, projected duration of connectivity, any combination thereof, or the like. Guest access portal 106 may be a website, application, portal page, any combination thereof, or the like. Guest access portal 106 may contain one or more input fields. For example, the guest user may fill out one or more input fields (e.g., name, address, phone number, etc.) within the guest access portal 106 comprising of a web form. Guest access portal 106 may request additional data from guest user device 118, including type of device, required bandwidth and/or network speed, any combination thereof, or the like. Guest access portal 106 may receive the Internet protocol ("IP") address of guest user device 118 upon receipt of the data provided in guest access portal 106.

After receiving data from the guest user device 118, enterprise policy function 108 may check the movement and roaming policy and determine whether to grant or deny the request from guest user device 118. In addition to granting or denying requests, enterprise policy function 108 may maintain one or more policies related to the movement and roaming policy, including segmentation policies, third-party policies, movement-specific policies, roaming-specific policies, etc. Enterprise administrator 102 may update the policies maintained in enterprise policy function 108 at any time.

Enterprise policy function 108 may communicate with enterprise AAA 110 to assign appropriate restrictions, permissions, and authorizations to guest user device 118. Enterprise AAA 110 may provide identity and policy services for enterprise service control 104, and may include the settings, protocols, and tables to support policy enforcement services. Enterprise AAA 110 may interact with enterprise service control 104 and with databases and directories containing information for users, devices, policies, and similar information to provide authentication, authorization, and accounting services. For example, enterprise policy function 108 may dictate that guest user device 118 does not have permission to roam to additional sectors within the enterprise, and enterprise AAA 110 may enforce enterprise policy function 108 on guest user device 118. Enterprise AAA 110 may provision particular credentials according to enterprise policy function 108.

Enterprise policy function 108 may include data pertaining to a guest user device and/or a group of guest user devices, including, but not limited to, movement type (e.g., fixed-by-site, nomadic-across-sites, nomadic-across-and-between-sites, mobile-across-sites, mobile-across-and-between-sites), service access privileges (e.g., guest, limited, full), session continuity type (e.g., none, best effort, critical), credential type (e.g., SIM, eSIM, certificate), and access types (e.g., enterprise Wi-Fi, enterprise private cellular, enterprise cables, macro SP GSM-A roaming partner, macro SP cellular or roaming partner, other enterprise private cellular, etc.). For example, guest user device 118 may be permitted to "roam" into enterprise private cellular at 'site one' only with an access privilege level of "guest access."

Once certificate delivery service 112 delivers a first credential to guest user device 118, SIM credential delivery service 114 may deliver a second credential to guest user device 118. Certificate delivery service 112 may deliver credentials associated with a first network (e.g., a Wi-Fi network). SIM credential delivery service 114 may deliver credentials associated with a second network (e.g., a private cellular network). To receive the first and/or second credential, guest user device 118 may input an access code, verification code, password, identity verification information, contact information, any combination thereof, or the like. In some examples, SIM credential delivery service 114 may deliver the first credential and certificate delivery service 112 may deliver the second credential.

Segmentation policy enforcement 120 may initiate appropriate network slicing and/or segmentation procedures according to the movement and roaming policy. Segmentation policy enforcement 120 may receive network slicing and/or permissions instructions from enterprise AAA 110. For example, a Public Land Mobile Network (PLMN), a private 5G network associated with the enterprise. Within the PLMN, a plurality of network slices are created, defined, or otherwise provisioned in order to deliver a desired set of defined features and functionalities for a certain use case or corresponding to other requirements or specifications (e.g., movement and roaming policy). The plurality of network slices may include one or more "guest" slices, wherein the one or more "guest" slices include varying levels of permissions and roaming capabilities according to the movement and roaming policy. In addition to network slicing on a private cellular network, segmentation policy enforcement 120 may enforce segmentation on a Wi-Fi network associated with the enterprise. For example, the Wi-Fi network may be segmented into a "guest" network and a second Wi-Fi network, wherein the guest network may include additional limitations on Internet browsing, visibility capabilities, network connectivity speeds, duration of connectivity, etc.

Segmentation policy enforcement 120 may implement the segmentation policies pertaining to guest user device 118 and input the permissions to segmentation control 116. Segmentation control 116 may coordinate the wireless LAN controller to apply segmentation policies to the network, including, but not limited to, guest user device 118. Segmentation control 116 may coordinate the private network cellular controller to apply network slicing and/or segmentation policies to the network, including, but not limited to, guest user device 118.

Figure 2:
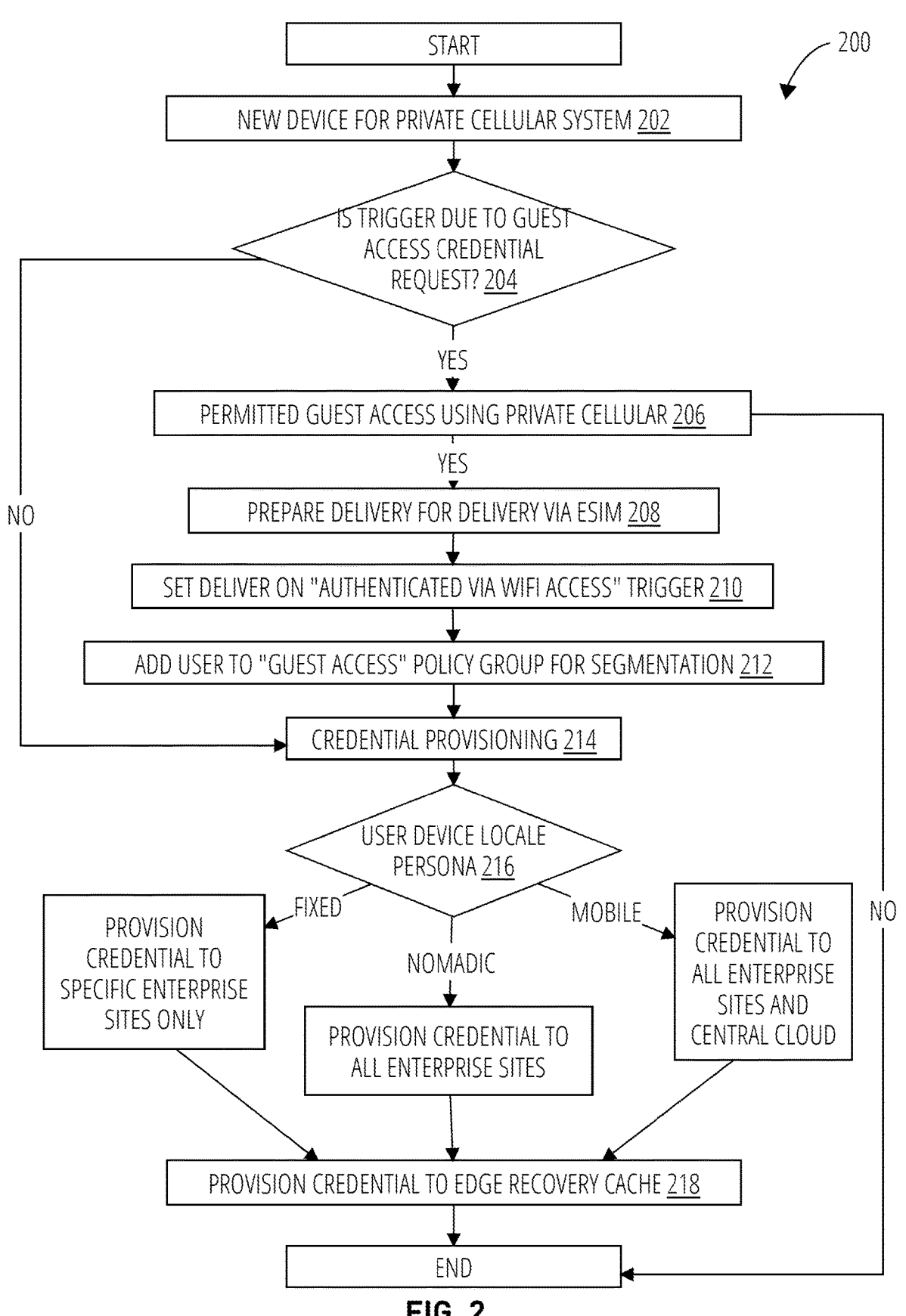
FIG. 2 illustrates a flowchart illustrating provisioning of credentials according to a movement and roaming policy according to aspects of the present disclosure.
Figure 3A:
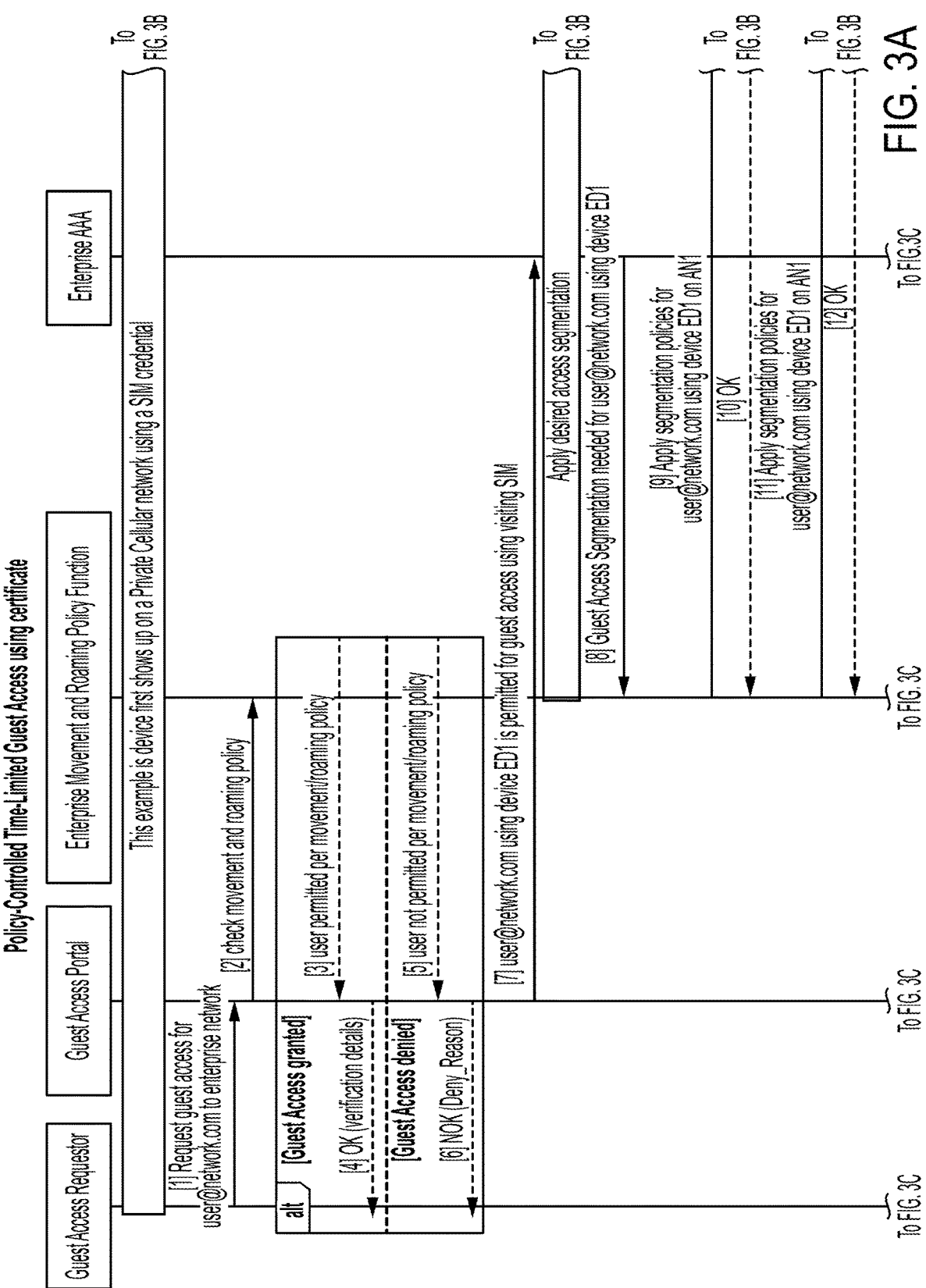
FIGS. 3A-3D illustrate an example routine for time guest access of a second network according to aspects of the present disclosure.
Figure 3B:
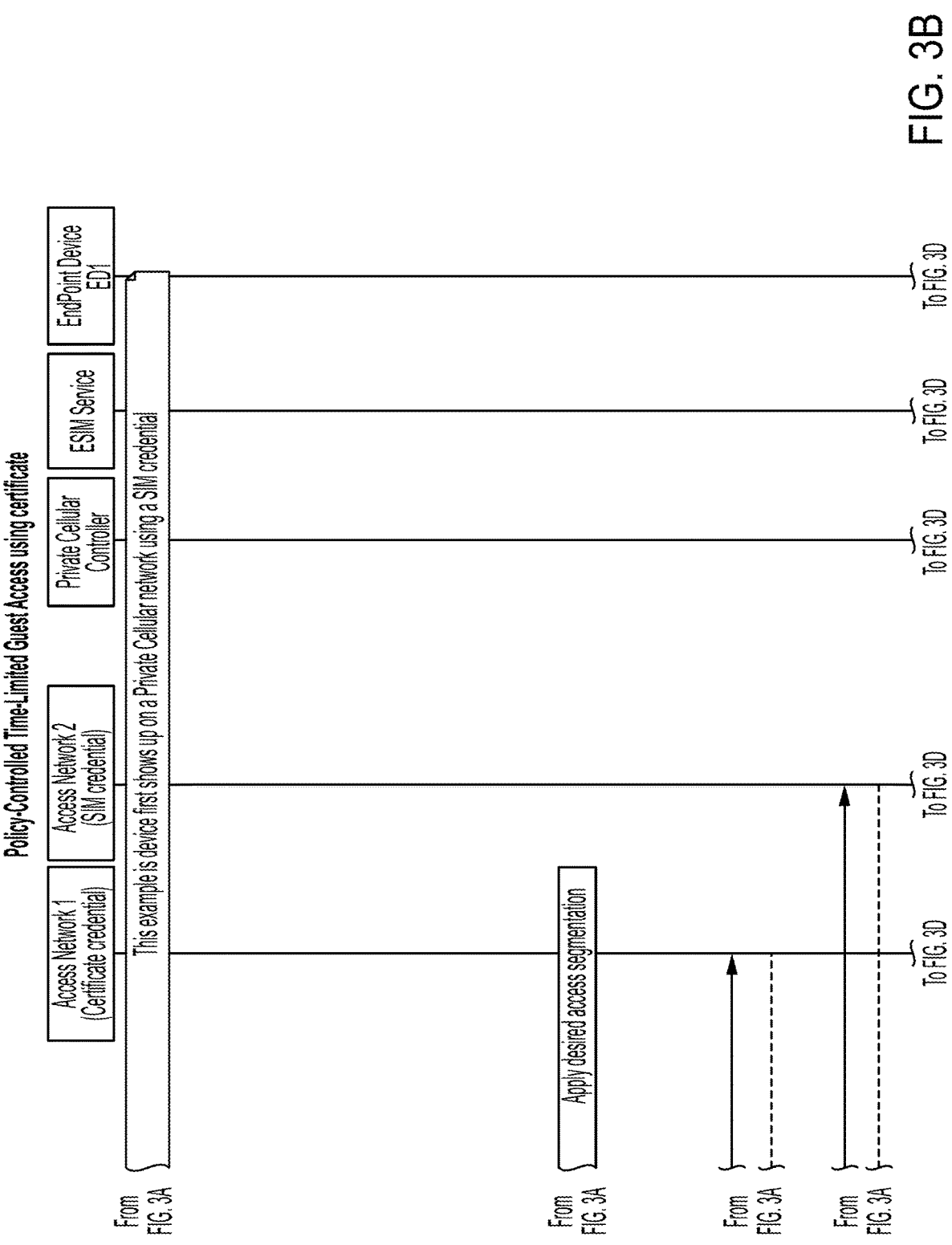
Figure 3C:
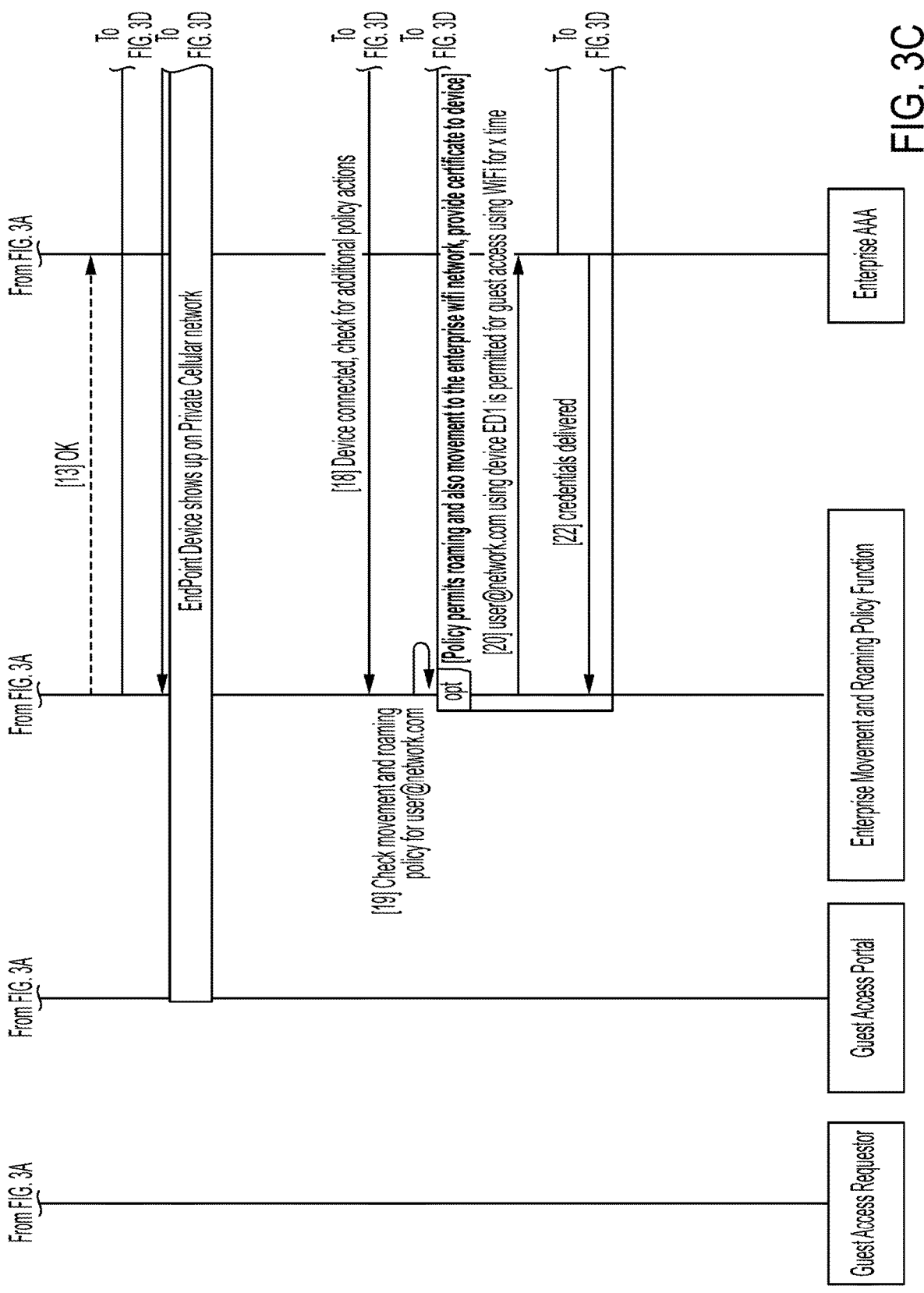
Figure 3D:
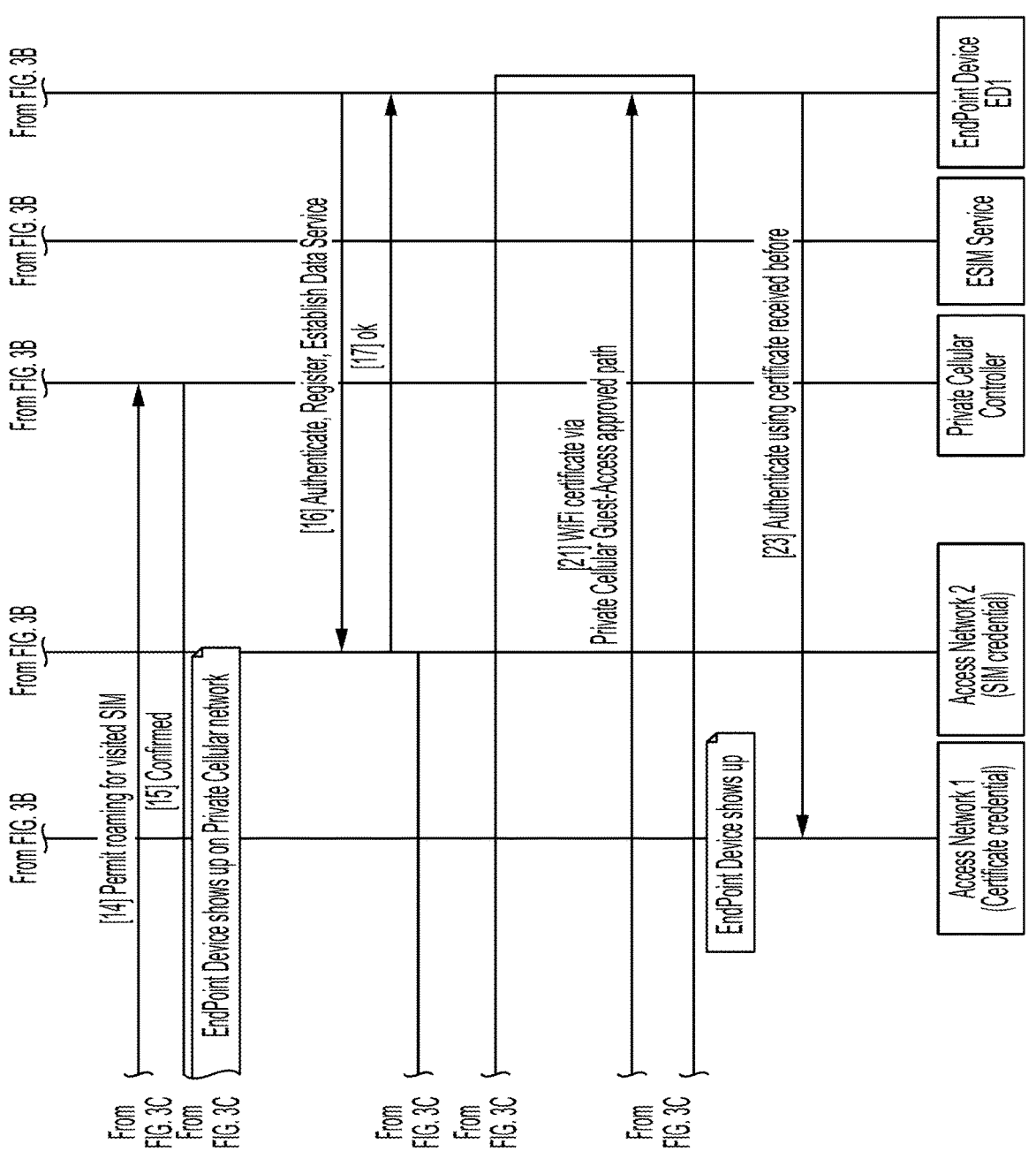
Figure 4A:
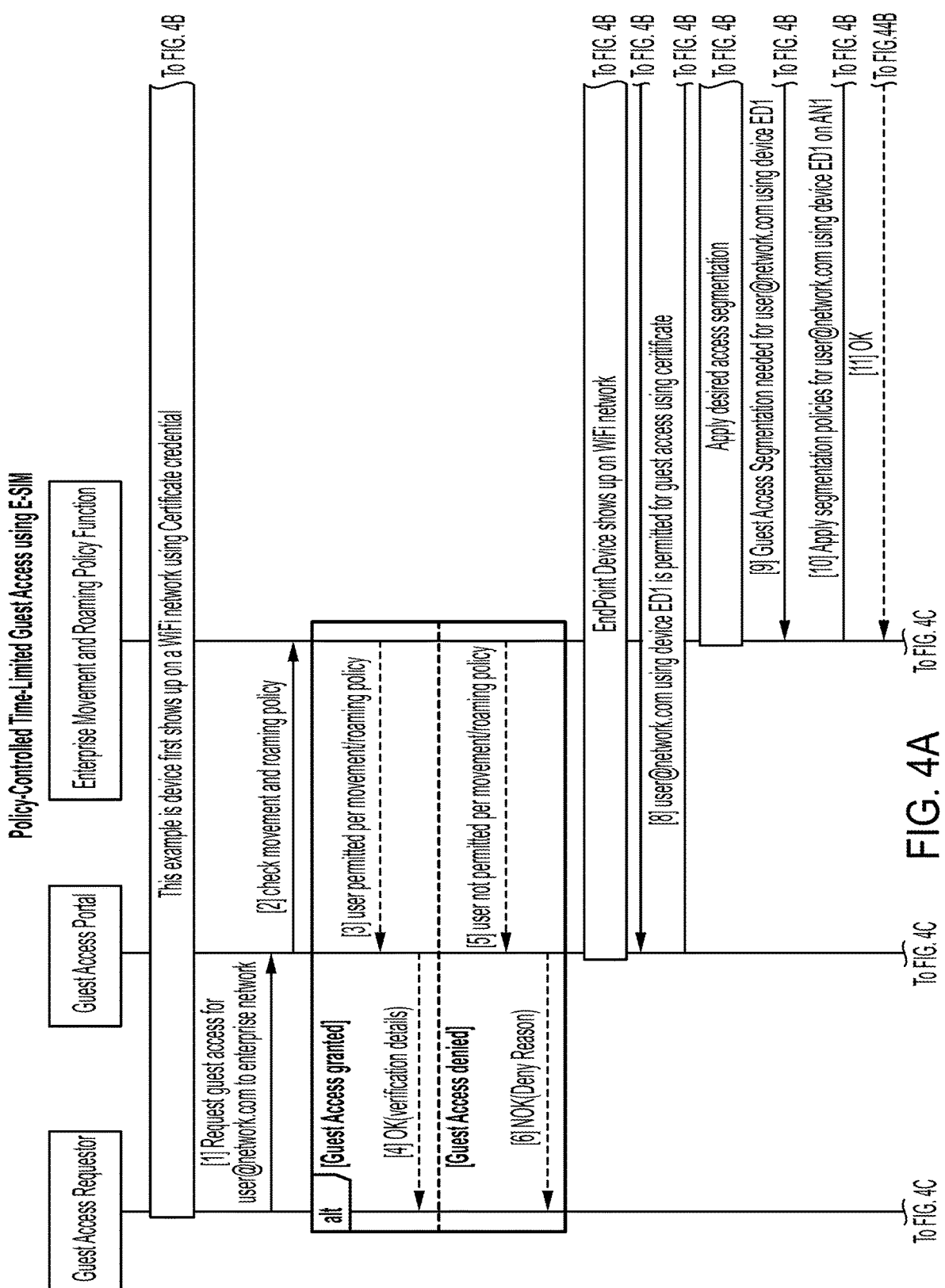
FIGS. 4A-4D illustrate an example routine for time guest access of a first network according to aspects of the present disclosure.
Figure 4B:
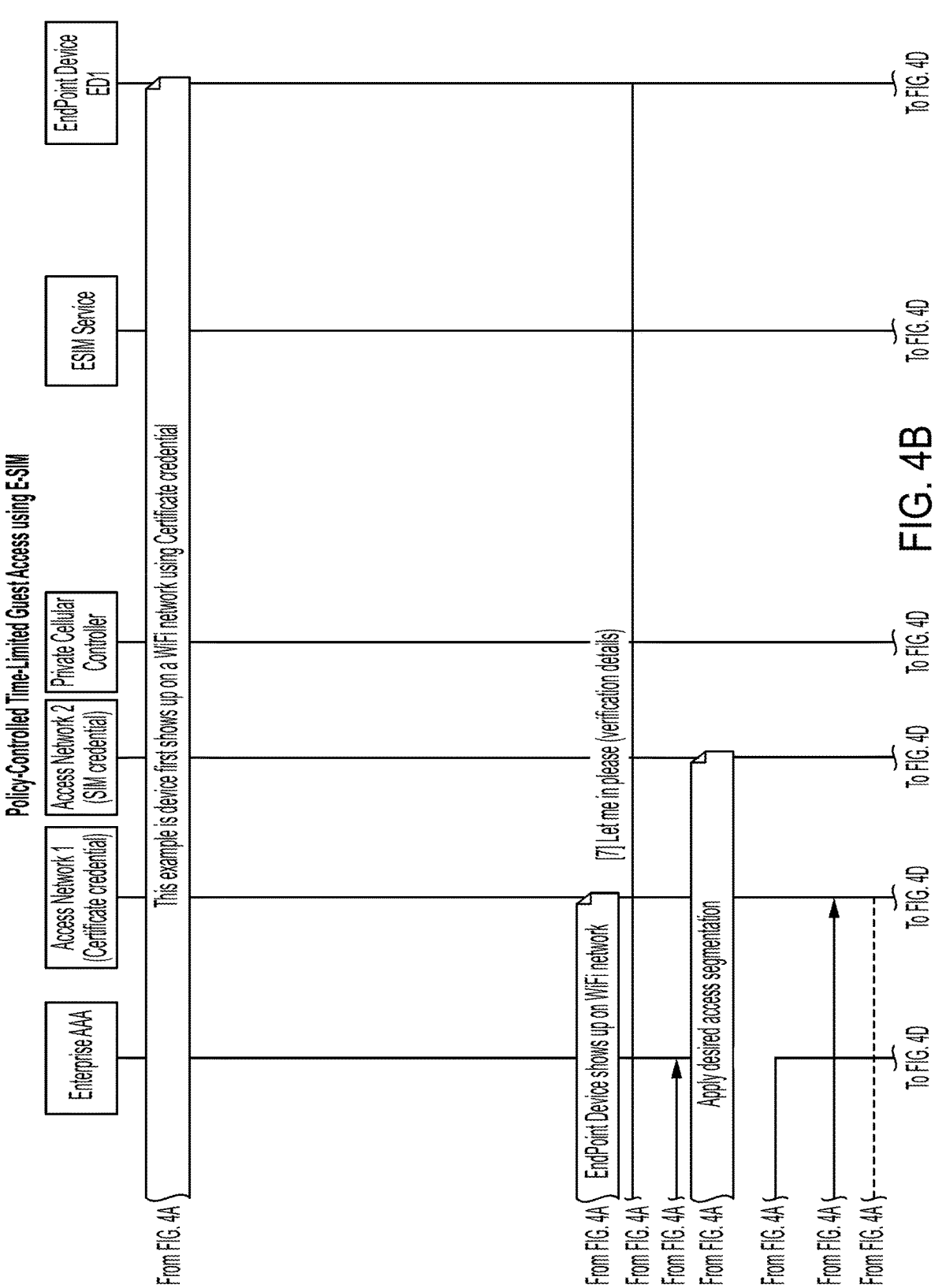
Figure 4C:
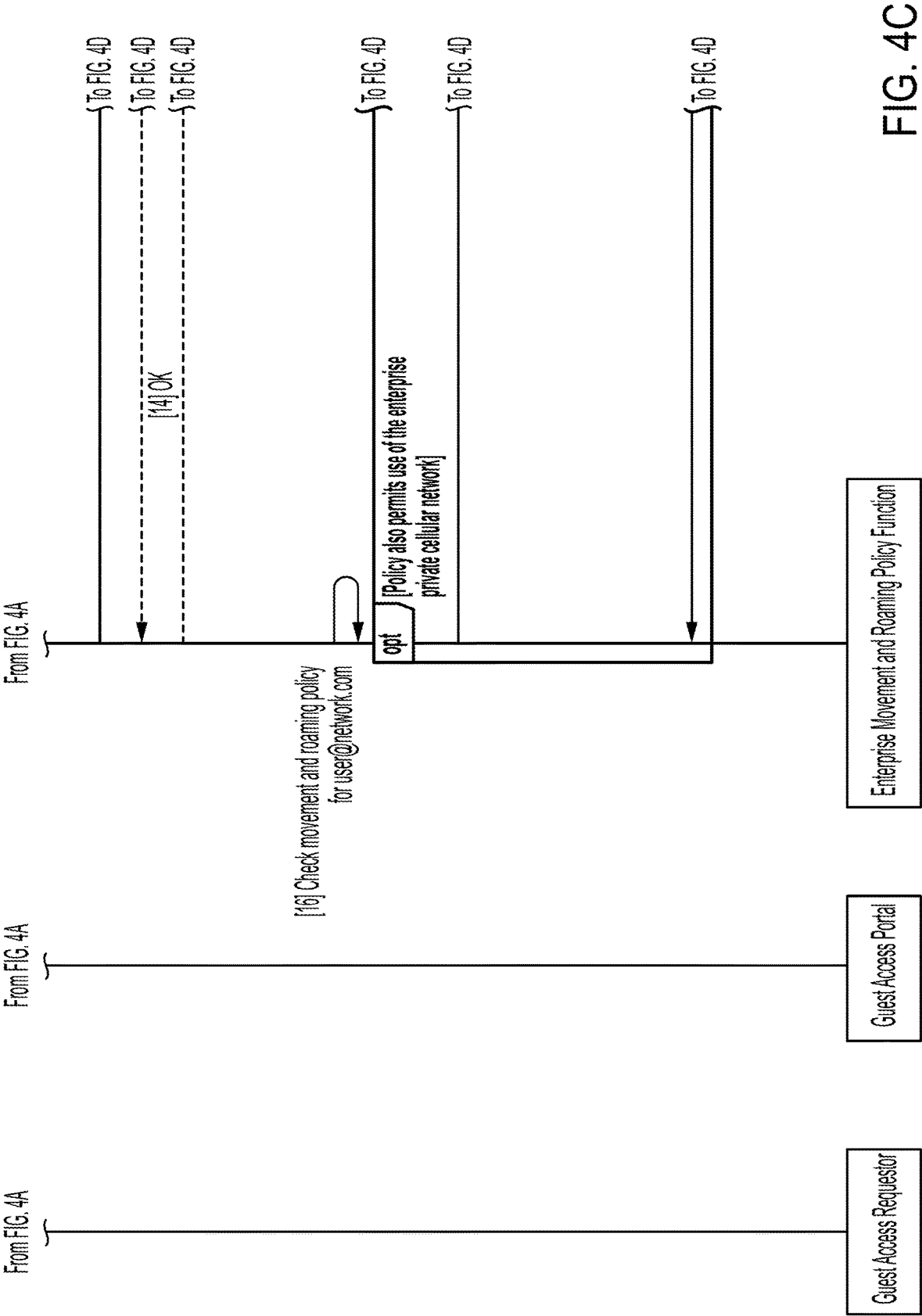
Figure 4D:
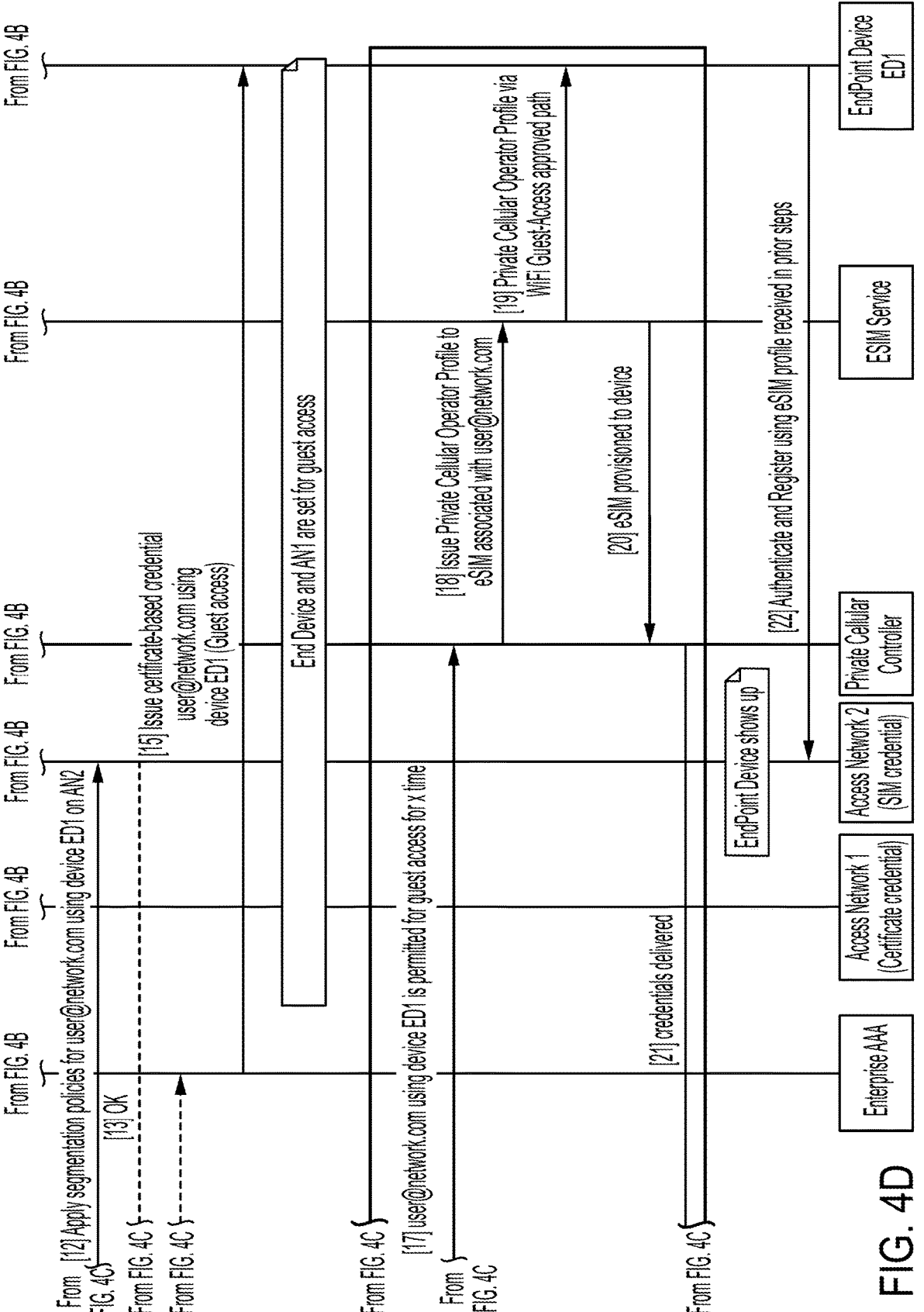

FIG. 2 illustrates a flowchart illustrating provisioning of credentials according to a movement and roaming policy in accordance with aspects of the present disclosure. Although the example routine 200 depicts a particular sequence of operations, the sequence may be altered without departing from the scope of the present disclosure. For example, some of the operations depicted may be performed in parallel or in a different sequence that does not materially affect the function of the routine 200. In some examples, different components of an example device or system that implements the routine 200 may perform functions at substantially the same time or in a specific sequence. Additionally, routine 200 depicts a guest user device receiving credentials for the first network, wherein the first network is a private cellular network. In some embodiments, the first network may be a Wi-Fi network.

At block 202, a new guest user device may enter the private cellular system radius. The cellular system radius may be a range of a particular tower, controller, base station, any combination thereof, or the like. The new guest user device may be a mobile phone, smart phone, personal computer, desktop computer, camera, tablet, any combination thereof, or the like. The private cellular system may be affiliated and/or associated with a particular enterprise. The enterprise may span multiple locations, wherein each location of the enterprise may comprise a cellular network associated with the private cellular system. The controllers for each location of the enterprise may be connected via a central controller, thereby synchronizing the permissions and movement and roaming policy for the private cellular system across the enterprise.

At block 204, a network (e.g., network controller or AAA such as enterprise AAA of FIG. 1) determines if the new guest user device has requested to join the first network via a guest access portal. The new guest user device may attempt to join a network manually, may submit a formal request (e.g., through an online form, e-mail, etc.), may be automatically triggered when the new guest user device enters the private cellular system radius, any combination thereof, or the like.

At block 206, the network determines if the new guest user device should be permitted access to the first network. The network receives data pertaining to the new guest user device (via the guest access portal and/or requested by the network upon the request), which may include, but is not limited to, type of device, required bandwidth and/or network speed, associated enterprise, etc. The network may also receive data via the guest access portal pertaining to a user associated with the new guest user device, including, but not limited to, name, address, email address, job title, associated enterprise, etc.

The network may utilize this data and query the movement and roaming policy (e.g., enterprise policy function 108 of FIG. 1) to confirm or deny the new guest user device access to the first network. The movement and roaming policy may also determine the permissions and limitations associated with the new guest user device on the first network (and any other affiliated networks). This may include roaming permissions, network access duration, network slice and/or segmentation, any combination thereof, or the like. If the network denies the new guest user device access, then the process concludes and the guest user device may not be permitted to join the first network (or any other affiliated networks). Upon the denial of access to the new guest user device, the network may indicate to the new guest user device a justification for the denial. For example, the new guest user device may receive a notification on the guest access portal that states, "Device A has insufficient internal security measures," "Device A is not a permitted device," and/or "User A is not a permitted user."

At block 208, if the new guest user device is permitted to access the first network, the network (e.g., SIM credential delivery service 114 of FIG. 1) may prepare a credential for delivery to the new guest user device. The credential may be associated with one or more attributes, including duration, network permissions, device permissions, sharing settings, administrator settings, any combination thereof, and the like.

At block 210, the network may set delivery of a Wi-Fi credential (e.g., a certificate) to be automatically delivered to the new guest user device. The network may reduce computational load by avoiding multiple queries to the movement and roaming policy, authentication services, any combination thereof, and the like.

At block 212, the network may apply segmentation and/or network slicing settings to the credential. For example, the new guest user device may only receive access to a particular domain and/or slice of a cellular network. The network slices may be configured for security reasons, such that guest user devices are not permitted to share a network with enterprise devices that may contain proprietary information. The network slices may also be configured for operational reasons, such that the client devices connected to the network are dispersed among one or more slices to preserve bandwidth and/or connectivity.

At block 214, the credential is provisioned to the new guest user device by the network (e.g., SIM credential delivery service 114 of FIG. 1 and/or enterprise AAA 110 of FIG. 1). When the credential is received by the new guest user device, the new guest user device may be granted access to the network within the parameters dictated by the movement and roaming policy.

The credential may be revoked, canceled, altered, or re-provisioned at any time. For example, while a guest user device is accessing the first network, a security breach may occur, requiring the removal of all guest devices from the first network. As another example, the movement and roaming policy may change over the duration of the guest user device's connectivity period. If the network receives an indication that the new guest user device has conducted impermissible activities whilst connected to the first network (or any other affiliated enterprise network), the credential may be revoked.

At decision block 216, the credential may be associated with one or more characteristics (e.g., fixed, nomadic, mobile). Depending on the roaming characteristic, the network may provision additional credentials to one or more enterprise sites. The additional credentials may be similar to the prior-provisioned credential to the new guest user device (e.g., may have the same restrictions). For example, if the credential is associated with a fixed policy attribute, then the network may only provision the credential to a specific enterprise site (e.g., only have access to the private cellular network in the New York office location). Additionally, if the credential is associated with a nomadic policy attribute, the network may provision the credential to one or more additional enterprise sites (e.g., have access to the private cellular network in the New York, New Jersey, Pittsburgh, and Boston office locations). If the credential is associated with a mobile policy attribute, the network may provision the credential to all enterprise sites and/or the central cloud of the network (e.g., have access to the private cellular network across the country).

At block 218, the credential may be provisioned to an edge recovery cache(s) that are appropriate for the characteristic of the device. In some examples, the automatic provisioning of credentials to the device to access multiple network types, and the provisioning of credentials to edge recovery cache(s) can reduce computational load on the network, server, controller, etc., thereby allowing the new guest user device to access the networks and the credential with reduced latency.

FIGS. 3A-3D illustrate an example routine for time guest access of a second network according to aspects of the present disclosure. The routine shown in FIGS. 3A-3D describe a guest user device receiving a first credential for a second network (in this case, private cellular) on a particular enterprise network, then receiving a second credential for a first network (in this case, Wi-Fi) on the particular enterprise network.

At step 1, a guest access requestor (e.g., a user associated with a guest user device, such as guest user device 118) requests guest access to a second network. The guest access requestor may request access via a guest access portal (e.g., guest access portal 106 of FIG. 1). The guest access requestor may input data and submit in conjunction with the request, such as an affiliated email address, name, contact information, device information, company/enterprise affiliations, any combination thereof, and the like.

At step 2, an enterprise movement and roaming policy function (e.g., enterprise policy function 108 of FIG. 1) checks a movement and roaming policy. The movement and roaming policy may have access to data and information related to users and/or user devices that may not be permitted to access the network. The enterprise movement and roaming policy function may query a database maintained by a computing device of the network, wherein the database may contain data and information related to users and/or user devices that may and/or may not be permitted to access the network. The data provided by the guest access requestor is cross-referenced and compared to the data within the database.

At step 3, the enterprise movement and roaming policy function may confirm the guest access requestor is permitted to access the network. For example, the data provided by the guest access requestor may not be substantially similar to data stored within the database corresponding to users and/or user devices that are not permitted on the network.

At step 4, the confirmation is relayed to the guest access requestor.

At step 5, the enterprise movement and roaming policy function may deny the guest access requestor permission to access the network. For example, the data provided by the guest access requestor may be substantially similar to data stored within the database corresponding to users and/or user devices that are not permitted on the network.

At step 6, the denial is relayed to the guest access requestor. The enterprise movement and roaming policy function, via the guest access portal, may provide a reason for the denial. For example, the guest access requestor may receive a notification on the guest access portal that states, "Device A has insufficient internal security measures," "Device A is not a permitted device," and/or "User A is not a permitted user."

At step 7, guest access portal may request permission on behalf of endpoint device (e.g., guest user device 118 of FIG. 1) for access via eSIM to the second network from the enterprise AAA (e.g., enterprise AAA 110 of FIG. 1).

At step 8, the enterprise AAA may query the enterprise movement and roaming policy function for segmentation policies that may apply to endpoint device and/or guest access requestor.

At step 9, the enterprise movement and roaming policy function may apply the segmentation policies to the first network credential delivery function. The segmentation policies may include network slicing policies. At step 10, the first network credential delivery function may confirm receipt of the segmentation policies.

In some embodiments, at step 11, the enterprise movement and roaming policy function may apply segmentation policies and/or network slicing policies to the second network credential delivery function. At step 12, the second network credential delivery function may confirm receipt of the segmentation policies. The segmentation and/or network slicing policies applied in steps 10 and 12 may include data segmentation (e.g., virtual routing and forwarding, virtual local area network, Security Group Tag) and cellular-specific aspects (e.g., access point name, slicing).

At step 13, the enterprise movement and roaming policy function may confirm the application of the segmentation and/or network slicing policies with the enterprise AAA.

At step 14, the enterprise movement and roaming policy function may transmit data to the private cellular controller indicating the roaming permissions and/or categorization (e.g., fixed, nomadic, mobile) of the visiting eSIM associated with guest access requestor and/or endpoint device. At step 15, the private cellular controller may confirm receipt to the enterprise movement and roaming policy function. After this confirmation, the endpoint device may appear on the private cellular network (i.e., second network). The endpoint device may not have access to the second network within the parameters and restrictions outlined in the enterprise movement and roaming policy.

The second network credential delivery function and/or the private cellular controller may configure one or more network controllers associated with other enterprise sites according to the applicable movement and roaming policies applicable to endpoint device and/or guest access requestor. For example, the second network credential delivery function may configure the eSIM to permit access at one or more additional enterprise sites.

At step 16, the endpoint device may authenticate, register, and establish data service with the second network credential delivery function. At step 17, the second network credential delivery function may confirm receipt of the authentication of the endpoint device. At step 18, the endpoint device may be full connected to the second network. The second network credential delivery function may query the enterprise movement and roaming policy function for additional policy actions. At step 19, the enterprise movement and roaming policy function may periodically check the movement and roaming policy for updates, modifications, additions, triggers, any combination thereof, or the like.

At step 20, the enterprise movement and roaming policy function may output a duration of time in which guest access requestor and the endpoint device may be permitted guest access on the first network. At step 21, the enterprise AAA may issue a Wi-Fi certificate. At step 22, the enterprise AAA may confirm with the enterprise movement and roaming policy function that the second credential (e.g., the Wi-Fi certificate) was delivered to the endpoint device.

At step 23, the guest access requestor, via endpoint device, may authenticate and register for first network access using the prior-received first network Wi-Fi certificate.

FIGS. 4A-4D illustrate an example routine for time guest access of a first network according to aspects of the present disclosure. The routine shown in FIGS. 4A-4D describe a guest user device receiving a first credential for a first network (in this case, Wi-Fi) on a particular enterprise network, then receiving a second credential for a second network (in this case, private cellular) on the particular enterprise network.

At step 1, a guest access requestor (e.g., a user associated with a guest user device, such as guest user device 118) requests guest access to a first network. The guest access requestor may request access via a guest access portal (e.g., guest access portal 106 of FIG. 1). The guest access requestor may input data and submit in conjunction with the request, such as an affiliated email address, name, contact information, device information, company/enterprise affiliations, any combination thereof, and the like.

At step 2, an enterprise movement and roaming policy function (e.g., enterprise policy function 108 of FIG. 1) checks a movement and roaming policy. The movement and roaming policy may have access to data and information related to users and/or user devices that may not be permitted to access the network. The enterprise movement and roaming policy function may query a database maintained by a computing device of the network, wherein the database may contain data and information related to users and/or user devices that may and/or may not be permitted to access the network. The data provided by the guest access requestor is cross-referenced and compared to the data within the database.

At step 3, the enterprise movement and roaming policy function may confirm the guest access requestor is permitted to access the network. For example, the enterprise movement and roaming policy function may verify that the data provided by the guest access requestor corresponds with a permitted user and/or user device.

At step 4, the confirmation is relayed to the guest access requestor.

At step 5, the enterprise movement and roaming policy function may deny the guest access requestor permission to access the network. For example, the data provided by the guest access requestor may be substantially similar to data stored within the database corresponding to users and/or user devices that are not permitted on the network.

At step 6, the denial is relayed to the guest access requestor. The enterprise movement and roaming policy function, via the guest access portal, may provide a reason for the denial. For example, the guest access requestor may receive a notification on the guest access portal that states, "Device A has insufficient internal security measures," "Device A is not a permitted device," and/or "User A is not a permitted user."

At step 7, the endpoint device (e.g., guest user device 118 of FIG. 1) may request access from the guest access portal. The endpoint device may be associated with the guest access requestor. The endpoint device may appear on the network Wi-Fi upon requesting access.

At step 8, guest access portal may request permission on behalf of endpoint device for access to the first network from the enterprise AAA (e.g., enterprise AAA 110 of FIG. 1). The enterprise AAA may provide identity and policy services for the enterprise movement and roaming policy function, guest access portal, the first network, and/or the network generally, and may include the settings, protocols, and tables to support policy enforcement services. The enterprise AAA may interact with enterprise movement and roaming policy function and with databases and directories containing information for users, devices, IoT devices, policies, and similar information to provide authentication, authorization, and accounting services. For example, enterprise movement and roaming policy function may dictate that endpoint device does not have permission to roam to additional sectors within the enterprise; and enterprise AAA may enforce enterprise movement and roaming policy function on endpoint device.

At step 9, the enterprise AAA may query the enterprise movement and roaming policy function for segmentation policies that may apply to endpoint device and/or guest access requestor.

At step 10, the enterprise movement and roaming policy function may apply the segmentation policies to the first network credential delivery function. The segmentation policies may include network slicing policies. At step 11, the first network credential delivery function may confirm receipt of the segmentation policies.

In some embodiments, at step 12, the enterprise movement and roaming policy function may apply segmentation policies and/or network slicing policies to the second network credential delivery function. At step 13, the second network credential delivery function may confirm receipt of the segmentation policies. The segmentation and/or network slicing policies applied in steps 10 and 12 may include data segmentation (e.g., virtual routing and forwarding, virtual local area network, Security Group Tag) and cellular-specific aspects (e.g., access point name, slicing).

At step 14, the enterprise movement and roaming policy function may confirm the application of the segmentation and/or network slicing policies with the enterprise AAA.

At step 15, the first credential may be provisioned to the endpoint device. In some embodiments, the first credential may be certificate based. The first credential may be configured to include the policies enforced and/or dictated by enterprise movement and roaming policy function, the enterprise AAA, first network credential delivery function, any combination thereof, or the like. The endpoint device may now have access to first network within the parameters and restrictions outlined in the enterprise movement and roaming policy.

At step 16, the enterprise movement and roaming policy function may periodically check the movement and roaming policy for updates, modifications, additions, triggers, any combination thereof, or the like. At step 17, the enterprise movement and roaming policy function may output a duration of time in which guest access requestor and the endpoint device may be permitted guest access on the second network. The enterprise movement and roaming policy function may output this data to a private cellular controller associated with the private cellular network of the enterprise.

At step 18, the private cellular controller may issue a private cellular operator profile to an eSIM associated with the guest access requestor. The eSIM may be configured using an eSIM service. At step 19, the endpoint device may receive the private cellular operator profile from the eSIM service. The private cellular operator profile may be associated with the data gathered from the guest access requestor upon requesting access to the first network. At step 20, the eSIM may be provisioned to the endpoint device. The private cellular controller may receive eSIM configuration data from the eSIM service, wherein the eSIM configuration data is associated with the endpoint device. At step 21, the private cellular controller may confirm with the enterprise movement and roaming policy function that the credentials (e.g., the eSIM configuration) were delivered to the endpoint device.

At step 22, the guest access requestor, via endpoint device, may authenticate and register for second network access the private cellular operator profile.

Figure 5A:
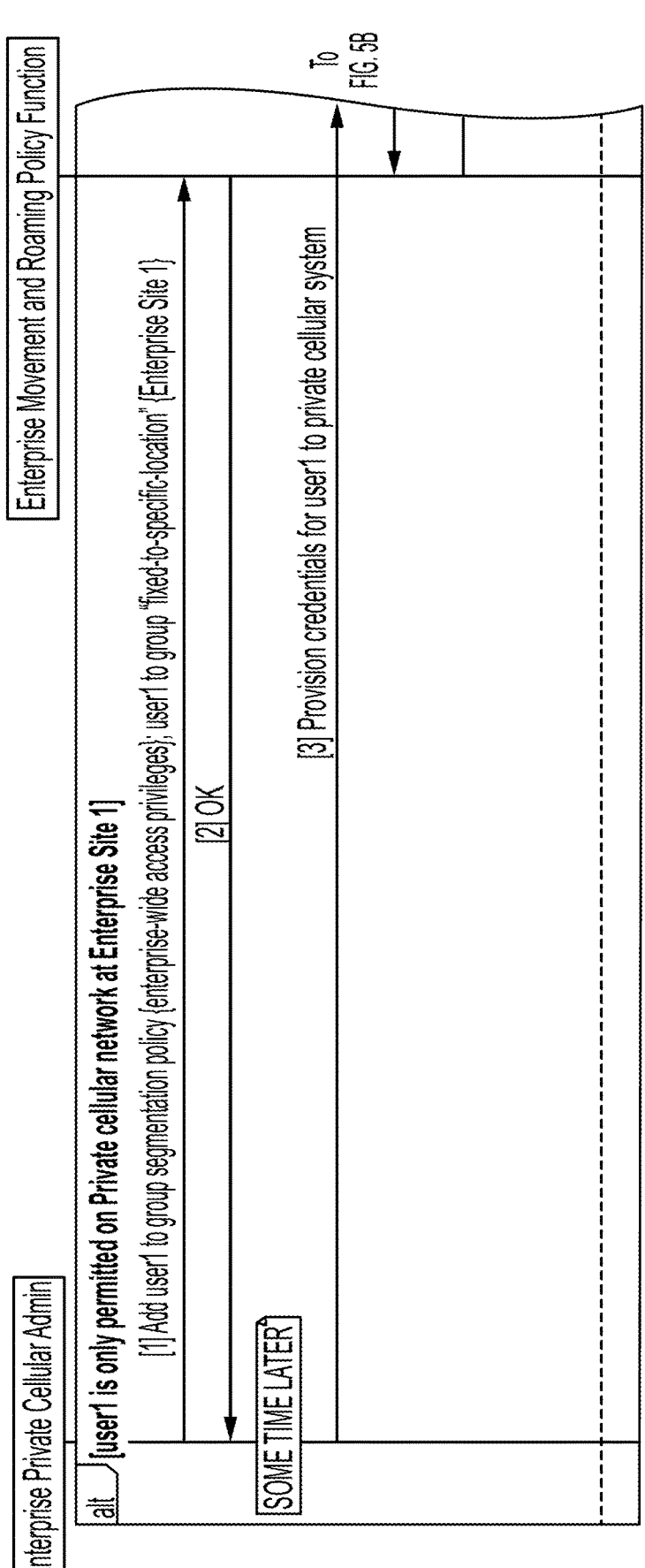
FIGS. 5A-5B illustrate an example routine for location dependent credential provisioning within an enterprise according to aspects of the present disclosure.
Figure 5B:
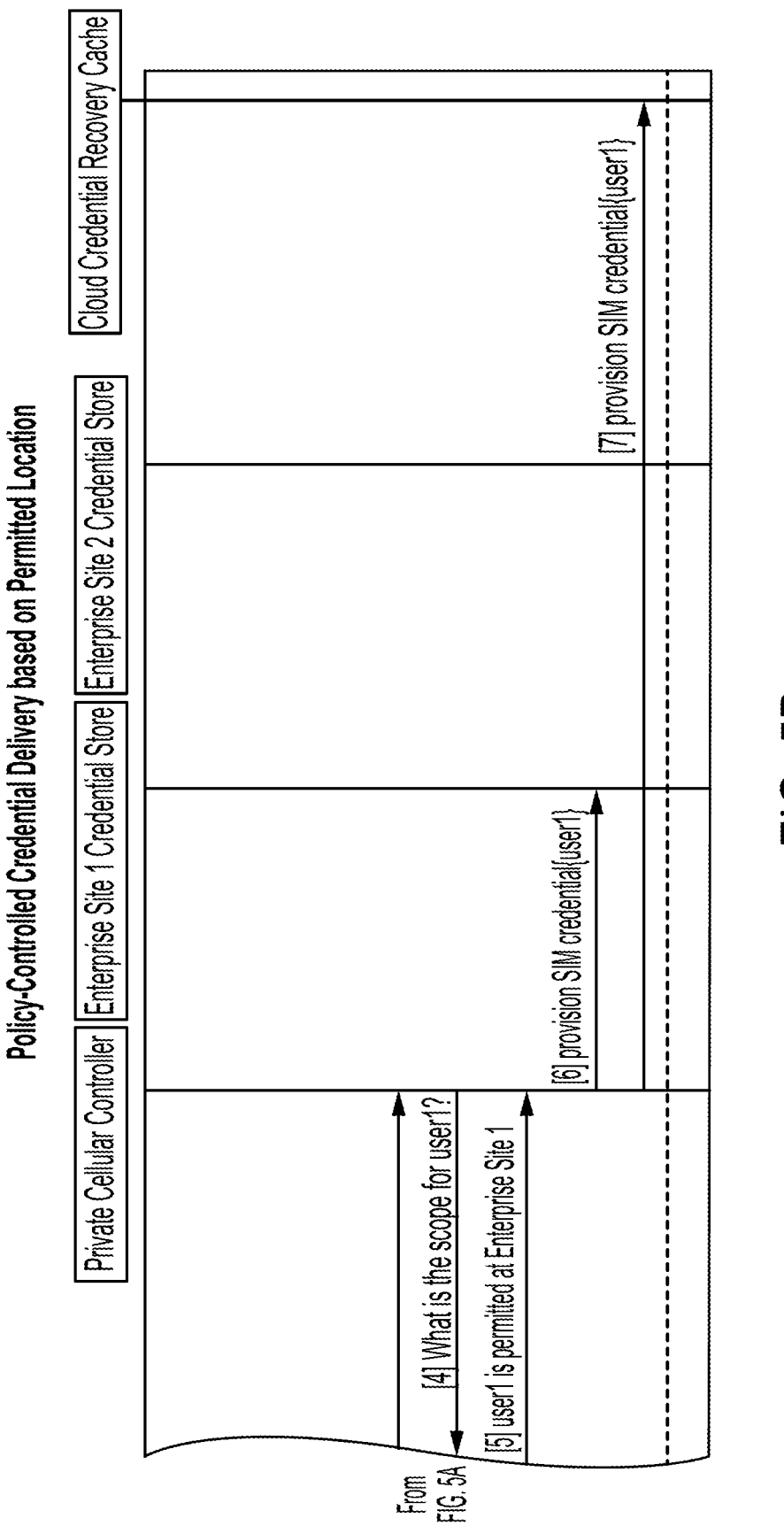

FIGS. 5A-5B illustrates an example routine for location dependent credential provisioning within an enterprise according to aspects of the present disclosure.

At step 1, an enterprise private cellular administrator (e.g., enterprise administrator 102 of FIG. 1, a network controller, enterprise service control 104 of FIG. 1, etc.) may request that a guest user device (e.g., guest user device 118 of FIG. 1) is added to a group policy with in the movement and roaming policy of an enterprise. An enterprise movement and roaming policy function may add the guest user device to the group policy after receiving a request. The group policy may comprise a blanket movement and roaming policy that applies to one or more individuals and/or devices that may or may not have a commonality (e.g., type of device, associated third-party, etc.). In this example, the guest user device is associated with a "fixed-to-specific-location" policy, which may describe a type of roaming policy. The guest user device may be only permitted access to the cellular network at Enterprise Site 1.

At step 2, the enterprise movement and roaming policy function may confirm the request.

At step 3, the enterprise private cellular administrator may send a request to a private cellular controller that appropriate credentials be provisioned to the guest user device for the private cellular network. The appropriate credentials may comply with the group policy of the movement and roaming policy of the enterprise.

At step 4, the private cellular controller may query the enterprise movement and roaming policy function to determine the scope, permissions, segmenting, slicing, etc. of the network access of the guest user device.

At step 5, the enterprise movement and roaming policy function may transmit the permissions associated with the group policy. For example, the guest user device is only permitted access at Enterprise Site 1.

At step 6, the private cellular controller may provision the eSIM credential for the guest user device. The guest user device may now have access to the private cellular network associated with the enterprise according to the limitations within the movement and roaming policy.

At step 7, the private cellular controller may transmit the eSIM credentials to a cloud credential recovery cache. This transmission may minimize the computational load for an enterprise network system, thereby allowing the guest user device to access the eSIM credential with minimal processing power and latency.

FIG. 6 illustrates an example routine 600 for managing and generating enterprise policy compliant guest credentials. Although the example routine 600 depicts a particular sequence of operations, the sequence may be altered without departing from the scope of the present disclosure. For example, some of the operations depicted may be performed in parallel or in a different sequence that does not materially affect the function of the routine 600. In other examples, different components of an example device or system that implements the routine 600 may perform functions at substantially the same time or in a specific sequence.

According to some examples, the method includes receiving a request from a guest user device to connect to a first network provided by an enterprise at block 602. For example, the enterprise AAA 110 can receive the request from a guest user device to connect to a first network provided by an enterprise. The guest user device may be a mobile phone, desktop computer, laptop, tablet, smartphone, smartwatch, any combination thereof, or the like. The first network may be one of one or more networks associated with the enterprise. In some embodiments, the guest user device may be associated with a group of users. The group of users may or may not share a commonality, including, but not limited to, type of device, enterprise and/or third-party associations, personal device (e.g., not owned by the enterprise, but by an employee of the enterprise and brought to an enterprise site), bandwidth requirements, any combination thereof, or the like. The request may be transmitted by the guest user device via a guest access portal. In some embodiments, the request may be transmitted by a network administrator or controller.

According to some examples, the method includes determining that the guest user device is authorized to access the first network when the access by the guest user is subject to a movement and roaming policy at block 604. For example, the enterprise AAA 110 can determine that the guest user device is authorized to access the first network when the access by the guest user is subject to a movement and roaming policy. The movement and roaming policy may define at least one of a movement type, a service access privilege, a session continuity type, a credential type, and an access type. The movement and roaming policy may be determined by an enterprise administrator. The enterprise administrator may be an individual, a group of individuals, a computing device assisted with machine-learning models, etc. The enterprise administrator may manage the movement and roaming policy according to the demands of the one or more networks within the enterprise and may modify the movement and roaming policy accordingly.

The method may further comprise configuring a movement and roaming policy to apply to the guest user to allow the guest user to access the first network and the second network using the guest user device, wherein the guest user is associated with a group of guest users. The movement and roaming policy may dictate a policy for a group of users. The method may further comprise extending the movement and roaming policy applicable to the guest user to the group of guest users. For example, an enterprise may be the site of a meeting involving a first corporation and a second corporation, and the enterprise may apply a movement and roaming policy to devices associated with the first corporation and devices associated with the second corporation. As another example, a third-party may visit the enterprise to conduct one or more tests on the network, and the enterprise may apply a movement and roaming policy to devices associated with the third-party conducting the network testing (e.g., IT testing).

According to some examples, the method includes causing a first credential to be provisioned for the guest user to access the first network that is consistent with the movement and roaming policy at block 606. For example, the first credential for access to the first network may be provisioned by enterprise policy function 108 and delivered by certificate delivery service 112. The first credential may be provisioned to the guest user by an enterprise movement and roaming policy function. The first credential may be configured according to the movement and roaming policy applicable to the guest user, including permissions, duration of access, roaming policies, etc.

According to some examples, the method includes prior to receiving a request to connect to a second network of the enterprise from the guest user device, cause a second credential to be provisioned to access the second network that is consistent with the movement and roaming policy, wherein the first network and the second network utilize different access credentials (e.g., certificate) at block 608. For example, prior to receiving a second request, the second credential for access to the second network may be provisioned by enterprise policy function 108 and delivered by SIM credential delivery service 114. For example, For example, the network may automatically generate and provision a second credential granting access to a second network (that may be different from the first network) before the guest user requests access to the second network. The first network and the second network may be different types of access networks (e.g., cellular/3GPP, Wi-Fi, etc.).

The second network of the enterprise may utilize SIM-based credentials and the enterprise includes multiple sites having local versions of the second network. For example, the enterprise may have an office (a "site") in New York, New Jersey, and Boston. Each site may have a local version of the second network, controlled via a cloud controller configured to manage the enterprise network. In some examples, the credential information for the guest user may be distributed to one or more sites and the guest user may be granted access to the one or more sites if permitted by the movement and roaming policy.

In some embodiments, the network may revoke the first credential and the second credential after a duration of time dictated by the movement and roaming policy. In an some embodiments, the movement and roaming policy may be updated while the guest user is connected to the network. The network may generate a provision an updated credential to the guest user that complies with an updated movement and roaming policy. In some instances, the guest user will not be granted an updated credential.

Figure 7:
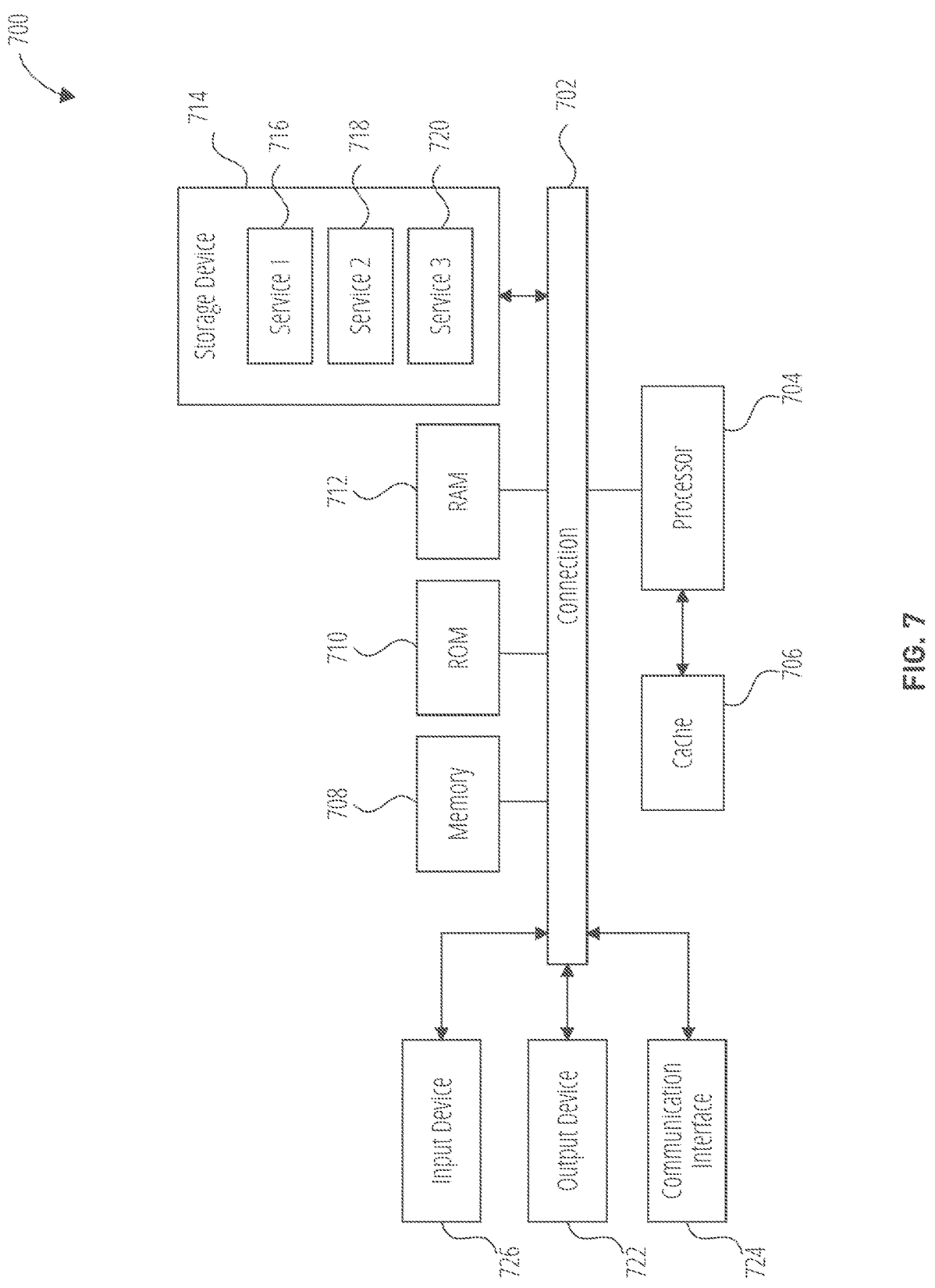
FIG. 7 shows an example of a computing system, which can be, for example any computing device that can implement components of the system according to aspects of the present disclosure.

FIG. 7 shows an example of computing system 700, which can be for example any computing device making up enterprise service control 104, segmentation control 116, segmentation policy enforcement 120, or any component thereof in which the components of the system are in communication with each other using connection 702. Connection 702 can be a physical connection via a bus, or a direct connection into processor 704, such as in a chipset architecture. Connection 702 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 700 includes at least one processing unit (CPU or processor) 704 and connection 702 that couples various system components including system memory 708, such as read-only memory (ROM) 710 and random access memory (RAM) 712 to processor 704. Computing system 700 can include a cache of high-speed memory 706 connected directly with, in close proximity to, or integrated as part of processor 704.

Processor 704 can include any general purpose processor and a hardware service or software service, such as services 716, 718, and 720 stored in storage device 714, configured to control processor 704 as well as a special-purpose processor where software instructions are incorporated into the actual processor design. Processor 704 may essentially be a completely self-contained computing system, containing multiple cores or processors, a bus, memory controller, cache, etc. A multi-core processor may be symmetric or asymmetric.

To enable user interaction, computing system 700 includes an input device 726, which can represent any number of input mechanisms, such as a microphone for speech, a touch-sensitive screen for gesture or graphical input, keyboard, mouse, motion input, speech, etc. Computing system 700 can also include output device 722, which can be one or more of a number of output mechanisms known to those of skill in the art. In some instances, multimodal systems can enable a user to provide multiple types of input/output to communicate with computing system 700. Computing system 700 can include communication interface 724, which can generally govern and manage the user input and system output. There is no restriction on operating on any particular hardware arrangement, and therefore the basic features here may easily be substituted for improved hardware or firmware arrangements as they are developed.

Storage device 714 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 714 can include software services, servers, services, etc., that when the code that defines such software is executed by the processor 704, it causes the system to perform a function. In some embodiments, a hardware service that performs a particular function can include the software component stored in a computer-readable medium in connection with the necessary hardware components, such as processor 704, connection 702, output device 722, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method of managing guest connectivity, comprising:

receiving a request from a guest user device to connect to a first network provided by an enterprise, wherein the first network is a private cellular system;

determining that the guest user device is authorized to access the first network when the access by the guest user device is authorized by a movement and roaming policy;

causing a first credential to be provisioned for the guest user device to access the first network that is consistent with the movement and roaming policy, wherein the first credential is associated with at least one characteristic;

prior to receiving a second request to connect to a second network of the enterprise from the guest user device, causing a second credential to be automatically provisioned to access the second network that is consistent with the movement and roaming policy, wherein the second network is a Wi-Fi network, and the first network and the second network utilize different access credentials; and provisioning one or more additional credentials to one or more respective networks to the guest user device based upon the at least one characteristic of the first credential.

2. The computer-implemented method of claim 1, further comprising:

configuring the movement and roaming policy to apply to a guest user to allow the guest user to access the first network and the second network using the guest user device, wherein the guest user is associated with a group of guest users; and extending the movement and roaming policy applicable to the guest user to the group of guest users.

3. The computer-implemented method of claim 1, wherein the first network and the second network are different types of access networks.

4. The computer-implemented method of claim 1, wherein the first network of the enterprise utilizes SIM-based credentials, wherein the enterprise includes multiple sites having local versions of the first network, the method further comprising:

distributing the first credential to a credential store located at the respective multiple sites for the local versions of the first network.

5. The method of claim 4, wherein the movement and roaming policy includes at least segmentation policy for network data to and from the guest user device.

6. The method of claim 1, wherein the different access credentials are a Wi-Fi certificate and an eSIM.

7. The method of claim 1, wherein the movement and roaming policy defines at least one of a movement type, a service access privilege, a session continuity type, a credential type, and an access type.

8. The method of claim 1, further comprising:

revoking the first credential and the second credential after a duration of time dictated by the movement and roaming policy.

9. The method of claim 1, further comprising:

updating the movement and roaming policy;

preparing one or more updated credentials associated with the guest user device; and provisioning the one or more updated credentials to the guest user device, which permit the guest user device to access the network.

10. A computing apparatus comprising:

a processor; and a memory storing instructions that, when executed by the processor, configure the apparatus to:

receive a request from a guest user device to connect to a first network provided by an enterprise, wherein the first network is a private cellular system;

determine that the guest user device is authorized to access the first network when the access by the guest user device is subject to a movement and roaming policy;

cause a first credential to be provisioned for the guest user device to access the first network that is consistent with the movement and roaming policy, wherein the first credential is associated with at least one characteristic;

prior to receiving a second request to connect to a second network of the enterprise from the guest user device, cause a second credential to be automatically provisioned to access the second network that is consistent with the movement and roaming policy, wherein the second network is a Wi-Fi network, and the first network and the second network utilize different access credentials; and provision one or more additional credentials to one or more respective networks to the guest user device based upon the at least one characteristic of the first credential.

11. The computing apparatus of claim 10, wherein the instructions further configure the apparatus to:

configure the movement and roaming policy to apply to a guest user to allow the guest user to access the first network and the second network using the guest user device, wherein the guest user is associated with a group of guest users; and extend the movement and roaming policy applicable to the guest user to the group of guest users.

12. The computing apparatus of claim 10, wherein the first network and the second network are different types of access networks.

13. The computing apparatus of claim 10, wherein the first network of the enterprise utilizes SIM-based credentials, wherein the enterprise includes multiple sites having local versions of the first network, wherein the instructions further configure the apparatus to:

distribute the first credential to a credential store located at the respective multiple sites for the local versions of the first network.

14. The computing apparatus of claim 10, wherein the different access credentials are a Wi-Fi certificate and an eSIM.

15. The computing apparatus of claim 10, wherein the movement and roaming policy defines at least one of a movement type, a service access privilege, a session continuity type, a credential type, and an access type.

16. The computing apparatus of claim 10, wherein the instructions further configure the apparatus to:

revoke the first credential and the second credential after a duration of time dictated by the movement and roaming policy.

17. The computing apparatus of claim 10, wherein the instructions further configure the apparatus to:

update the movement and roaming policy;

prepare one or more updated credentials associated with the guest user device; and provision the one or more updated credentials to permit the guest user device to access the network.

18. A non-transitory computer-readable storage medium, the computer-readable storage medium including instructions that when executed by a computer, cause the computer to:

receive a request from a guest user device to connect to a first network provided by an enterprise, wherein the first network is a private cellular system;

determine that the guest user device is authorized to access the first network when the access by the guest user device is subject to a movement and roaming policy;

cause a first credential to be provisioned for the guest user device to access the first network that is consistent with the movement and roaming policy, wherein the first credential is associated with at least one characteristic;

prior to receiving a second request to connect to a second network of the enterprise from the guest user device, cause a second credential to be automatically provisioned to access the second network that is consistent with the movement and roaming policy, wherein the second network is a Wi-Fi network, and the first network and the second network utilize different access credentials; and provision one or more additional credentials to one or more respective networks to the guest user device based upon the at least one characteristic of the first credential.

19. The computer-readable storage medium of claim 18, wherein the instructions further configure the computer to:

configure the movement and roaming policy to apply to a guest user to allow the guest user to access the first network and the second network using the guest user device, wherein the guest user is associated with a group of guest users; and extend the movement and roaming policy applicable to the guest user to the group of guest users.

20. The computer-readable storage medium of claim 18, wherein the instructions further configure the computer to:

revoke the first credential and the second credential after a duration of time dictated by the movement and roaming policy.

\* \* \* \* \*